(12) United States Patent
Shetty et al.

(10) Patent No.: US 10,311,374 B2
(45) Date of Patent: Jun. 4, 2019

(54) CATEGORIZATION OF FORMS TO AID IN FORM SEARCH

(71) Applicant: Adobe Inc., San Jose, CA (US)

(72) Inventors: Shipali Shetty, San Jose, CA (US); Shawn A. Gaither, Raleigh, NC (US)

(73) Assignee: Adobe Inc., San Jose, CA (US)

( * ) Notice: Subject to any disclaimer, the term of this patent is extended or adjusted under 35 U.S.C. 154(b) by 486 days.

(21) Appl. No.: 14/852,169

(22) Filed: Sep. 11, 2015

(65) Prior Publication Data

US 2017/0075974 A1    Mar. 16, 2017

(51) Int. Cl.
*G06F 17/24*    (2006.01)
*G06N 20/00*    (2019.01)

(52) U.S. Cl.
CPC .......... *G06N 20/00* (2019.01); *G06F 17/243* (2013.01)

(58) Field of Classification Search
CPC .......... G06K 9/00442; G06K 9/00449; G06K 9/00463
See application file for complete search history.

(56) References Cited

U.S. PATENT DOCUMENTS

| | | | | |
|---|---|---|---|---|
| 8,595,235 B1 * | 11/2013 | Sampson | ........... | G06K 9/00483 707/737 |
| 2010/0284623 A1 * | 11/2010 | Chen | ................. | G06K 9/00463 382/224 |
| 2015/0071549 A1 * | 3/2015 | Chajed | ............... | G06K 9/00456 382/199 |
| 2015/0178563 A1 * | 6/2015 | Galleguillos | ...... | G06K 9/00483 382/218 |
| 2016/0092730 A1 * | 3/2016 | Smirnov | ............ | G06K 9/00456 382/195 |

OTHER PUBLICATIONS

Schütze, Hinrich, Christopher D. Manning, and Prabhakar Raghavan. Introduction to information retrieval. vol. 39. Cambridge University Press, 2008. (Year: 2008).*

* cited by examiner

*Primary Examiner* — William Spieler
(74) *Attorney, Agent, or Firm* — Kilpatrick Townsend & Stockton LLP (57) ABSTRACT

Systems and methods disclosed herein associate forms with categories based on form features for non-text field characteristics or field-specific text characteristics of the forms. One embodiment provides a method for facilitating searching for a form by associating forms with categories based on form features. The method involves automatically associating, by a processor of a computing device, forms with respective categories based on form features for non-text field characteristics or field-specific text characteristics of the forms and storing the forms and the respective categories associated with the forms at an electronic form search server. Search results are provided from the electronic form search server based on input identifying a search category and a form is identified as a search result based on the form being associated with the search category.

20 Claims, 5 Drawing Sheets

CATEGORIZATION OF FORMS TO AID IN FORM SEARCH

TECHNICAL FIELD

This disclosure relates generally to computer-implemented methods and systems and more particularly relates to improving the efficiency and effectiveness of computing systems used in searching for and using forms.

BACKGROUND

Web search engines provide search tools for entering text strings to search for documents on the Internet. Such text-based search tools are not well suited for finding forms for various reasons. The difficulty in searching for forms is partly due to the fact that forms related to many different topics can have similarities and a user searching for a particular form must thus review many potential results from these different topics. For example, forms related to employment, medicine, and athletic activities all include text such as "name," "address," "phone," "registration," "medicine," "physician," etc. Searching for a particular form can thus be time consuming and burdensome for a user. The user may be required to try multiple search text strings and/or search through many results to find the particular form of interest.

Existing document classifications techniques do not accurately classify documents to facilitate searching for forms by topic. This is because such techniques typically rely on only the words in the document. One such technique uses automatic text classification using supervised learning in which pre-defined category labels are assigned to documents based on the likelihood suggested by a training set of labeled documents. Words in the documents are considered features of the documents and these features are used to categorize the documents. However, this technique does not adequately categorize forms because forms in multiple categories usually share a large number of common words and thus common features. Words alone are a poor criterion for categorizing forms.

SUMMARY

Systems and methods disclosed herein associate forms with categories based on form features for non-text field characteristics or field-specific text characteristics of the forms. One embodiment provides a method for facilitating searching for a form by associating forms with categories based on form features for non-text field characteristics or field-specific text characteristics of the forms. The method involves automatically associating, by a processor of a computing device, forms with respective categories based on form features for non-text field characteristics or field-specific text characteristics of the forms and storing the forms and the respective categories associated with the forms at an electronic form search server. Search results are provided from the electronic form search server based on input identifying a search category. This involves identifying a form as a search result based on the form being associated with the search category.

Another embodiment provides a method for facilitating searching for a form by associating forms with categories based on form features. The method involves creating a training model using form features for non-text field characteristics or field-specific text characteristics of forms in a collection of forms. Additional forms, i.e., ones not already categorized, are then automatically associated with respective categories based on the training model and the form features of those additional forms. The forms and respective categories are stored at an electronic form search server and search results are provided based on the categories of the forms.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

As described above, searching for forms can be a time consuming and frustrating process due to the fact that forms related to many different topics can have similarities and a user searching for a particular form must thus review many potential results from these different topics. The invention automatically classifies forms into categories using form features for non-text field characteristics (e.g., field spacing) or field-specific text characteristics (e.g., that a form has a field with field label text "Full Legal Name") as an alternative to, or in addition to, using the words in the form. Using form features for non-text field characteristics or field-specific text characteristics in categorizing forms greatly improves the accuracy of the categorization over using words alone. The accurately-categorized forms can then be more easily and quickly searched using category-specific search criteria in addition to or, as an alternative to, keyword based search criteria. For example, a user can search a database of categorized forms for search results that only include forms in an "IRS" category. Other exemplary categories include, but are not limited to medical/health, school (primary, high school, university), hotel reservation/rental, and registration.

Automatic form classification uses a machine learning algorithm in one embodiment. A training set of a collection of user forms is used to create a training model and each form is represented in terms of a feature vector for categorization using the training model. The feature vectors for the forms are generated with features based on non-text field characteristics (e.g., the number of fields, the types of fields, the locations of fields, etc.) or field-specific text characteristics (e.g., the field label text, font, or orientation associated with a particular field, etc.) in addition to, or as an alternative to, features based on plain document text. In one embodiment, the feature set includes one or more of these form specific features in addition to text-based features. Once the training model is created it is used to categorize uncategorized forms. The system identifies features of a new uncategorized form and then uses the training model to determine that the form should be categorized, for example, in an "Medical" form category. Thus the training model receives as input features of a form and identifies, based on the features, an appropriate category or categories. In developing the training model, the system identifies features (closely spaced fields, more than 20 check box fields, etc.) in forms already identified as medical forms. The new form, because it also has some of these same features, is classified based on the training model in the medical form category.

Automatic and accurate category classification of forms allows users to browse and search for forms using category labels, as well as to quickly narrow down what would otherwise be a comprehensive and therefore slower search. More efficient and effective ways to search for and use forms are provided by using non-text field characteristics or field-specific text characteristics instead of (or in addition to) text-based search criteria to categorize forms.

In addition to using categories to represent topic, categories can represent complexity. In one example, forms are classified based on complexity (e.g., simple, medium complexity, and very complex) based on various factors such as the number of segments. Complexity-type categories can be used alternatively or additionally to topic-based categories for facilitate searching for forms, among other uses.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the phrase "form" refers to a paper or electronic document that is structured for completion by someone filling out the document with information that is expected to be put at specific places on the document. Typically, a form includes a template of fields and additional information added by one or more persons completing the form. A form will generally provide a way for the persons entering information to enter information in a consistent way so that a receiver of multiple instances of the completed form can read or extract information at particular locations on the form and understand, based on the location, the information. Similarly, the use of fields at particular locations on forms facilitates the automatic interpretation of information entered onto the forms. A form may, for example, have a name field and a recipient or analysis application may understand based on the location of the text added to the form by a person completing the form that the added text is the name of the person. The template of a form can specify fields and field characteristics.

As used herein, the phrase "field" refers to a location in a form or a portion of a form at which one or more items of information are entered when the form is completed. Text boxes, Boolean graphics such as checkboxes, and signatures are examples of fields. A field has one or more field characteristics. Fields can be defined explicitly and identified expressly, for example, using metadata in the form. Fields that are not defined can be inferred, for example, using a recognition algorithm that uses appearance of certain graphical objects (lines, rectangles, circle, radio buttons, checkboxes, etc.) to identify locations as candidate fields where information is to be entered when the form is completed.

As used herein the phrase "field characteristic" refers to aspects of a field that identify where the field is located, what information the field should contain, what type of data should be input into the field, etc. Examples of field characteristics include, but are not limited to, field location, field boundary, field label, field input type, field information type, etc. A field boundary is an invisible or visual representation of the bounds of the field. A field input type defines what type of user input changes the information entered into the field (e.g., text entry, drop down choices, check box, radio button, Boolean input, image, etc.). A field information type identifies the subject matter of the field (e.g., "first name" field, "address" field, "VIN" field, etc.). The characteristics of a field may be manually, semi-automatically, or automatically detected on a form. Characteristics of each field may be stored as metadata as part of a form and/or separate from a form.

As used herein the phrase "non-text field characteristics" of a form refers to non-textual aspects of one or more fields including, but not limited to, the number and types of fields in the form, the locations of fields, the boundary dimensions of fields, the information types of fields, the font size and type (e.g., italic, bold, underline, etc.) of labels and field text, the distributions of field labels, the field decorations, the field input types, the spacing or separator type between a label and a field, the separator lines and whitespace between conceptual sections, etc.

As used herein the phrase "field-specific text characteristic" of a form refers to a characteristic of a form having a field that specifies a particular label text, hint text, text font, text spacing, or text orientation. An example field-specific text characteristic is that a form has a field with field label text "Full Legal Name." The field-specific text characteristic is that the form has a field that has a property (i.e., its label text) having a particular value. The text of the label without the association to the field is not a field-specific text characteristic. Thus, raw text appearing in a form that is not associated with a field is not a field-specific text characteristic. Field-specific text characteristics can be identified directly or inferred. In cases of structured forms, field-specific text characteristics can be identified using metadata that specifies the hint shown to users or the name given to the field in a form that defines the form's structure. In cases of unstructured forms in which form field recognition is employed, field-specific text characteristics can be inferred, for example, by identifying label text associated with each field candidate.

As used herein the term "category" refers to a general class of ideas, terms, or things that provides a division within a collection of forms. A form is determined to be within or outside of a given category. For example, given category A and category B, in a collection of forms, some of the forms can be in neither category, some forms can be in both categories, some forms can only be in category A, and some forms can only be in category B. In one embodiment, a collection of forms is categorized such that each form is categorized into at most one form. In another embodiment, a collection of forms is categorized such that each form can be in any number of categories. Categories can relate to subject matters, e.g., IRS forms, athletic activity forms, medical forms, employment forms, etc. Categories, however, do not need to relate to specific subject matters. In one embodiment, both categories related to subject matters and categories not related to subject matters are used together.

Figure 1:
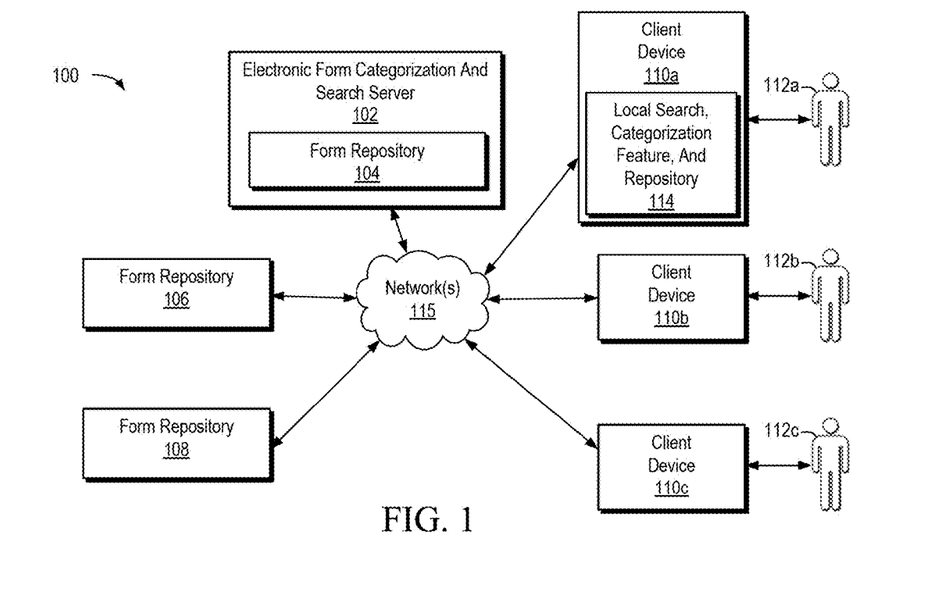
FIG. 1 is a block diagram depicting an example of a system for using form features for non-text field characteristics or field-specific text characteristics to provide form searching and categorization services using an electronic form search and categorization server.

Referring now to the drawings, FIG. 1 is a block diagram depicting an example of a system for using form features for non-text field characteristics or field-specific text characteristics to provide form searching and recommendation services using an electronic form categorization and search server 102. Individuals 112a-c use client devices 110a-c to access the electronic form search service features through network 115. In one example, client device 110a accesses electronic form categorization and search server 102 and receives a hyper-text-markup-language (HTML) page or other web page file(s). A search interface is displayed in a web browser on client device 110a. In this example, the individual 112a enters a category and/or other search criteria into the search interface and submits a request that is sent from client device 110a to electronic form categorization and search server 102. The electronic form categorization and search server 102 processes the specified category and other search criteria to search a repository 104 for matching forms. Forms are identified as search results and the search results are provided from the electronic form categorization and search server 102 to the client device 110a, where they are displayed in the user interface for selection and use by individual 112a.

The repository or repositories that are searched can be on the electronic form categorization and search server 102, such as in form repository 104. Additionally or alternatively, electronic form categorization and search server 102 may search a remote network location, for example, using network 115 to access form repositories 106, 108 located on separate servers and/or using network 115 to access a form repository located on the client devices 110a-c themselves. The search interface can receive input identifying which of a plurality of repositories should be searched in a particular search. Forms stored in the repository or repositories can be indexed in a database using the field characteristics of the forms.

Form processing, categorization, and search features can additionally or alternatively be provided locally on the client device 110a. For example, client device 110a, as illustrated, maintains its own local form search, categorization feature, and repository 114. Local form search, categorization feature, and repository 114 in this example comprises a stand-alone application providing user interface, form processing, form categorization, and form search functionality and a memory storing a repository of forms that are searched by the application.

The search functionality provided by the electronic form categorization and search server 102 or form search, categorization feature, and repository 114 searches using form criteria that includes form category. In one example, the search criteria identify "IRS" as the category and the search term "2015," and the search functionality limits its searching to forms within the category "IRS" and containing the text term "2015." In this example, the search server uses both category and text/keywords to search for search results. In one embodiment, using both category and text to search involves first identifying a category and then only searching for forms within that category. Another embodiment, transforms category determinations into text terms that are associated with potential search results and used as search query terms. In such cases, a single search is performed to identify search results.

A form categorizing feature is also provided by the electronic form categorization and search server 102 or form search, categorization feature, and repository 114. The form categorization feature can be used to categorize an uncategorized form or collection of forms if, for example, forms in repository 104 have not been categorized, or can be used to categorize new forms that are added to the repository 104.

Figure 2:
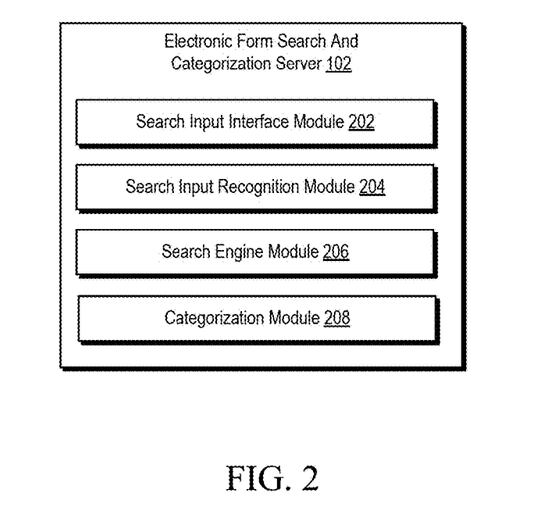
FIG. 2 is a block diagram illustrating exemplary modules for implementing functions in electronic form categorization and search server FIG. 1.

FIG. 2 is a block diagram illustrating exemplary modules for implementing functions in electronic form categorization and search server 102 of FIG. 1. Similar modules could additionally or alternatively be used in feature 114 of FIG. 1. The electronic form categorization and search server 102 includes modules 202, 204, and 206, which each are implemented by a processor executing stored computer instructions. Search input interface module 202 provides a user interface for entering search criteria and for viewing and interacting with search results.

Search input recognition module 204 analyzes search input provided through a search interface to identify appropriate search criteria. In one example, text is received and the search input recognition module 204 identifies that an entered search term corresponds to a category. Such an identification can be based on an explicit identification of the term as corresponding to a category or based on determining that a text search term matches a category description, e.g., "IRS" matches the "IRS" category description.

Search engine module 206 performs the search to identify forms as search results. Such processing may involve comparing the search criteria to metadata stored for each of a plurality of potential form search results or involve using an index of information about stored forms. Searching may involve prioritizing potential search results with respect to how well each potential search result matches the search criteria.

Figure 6:
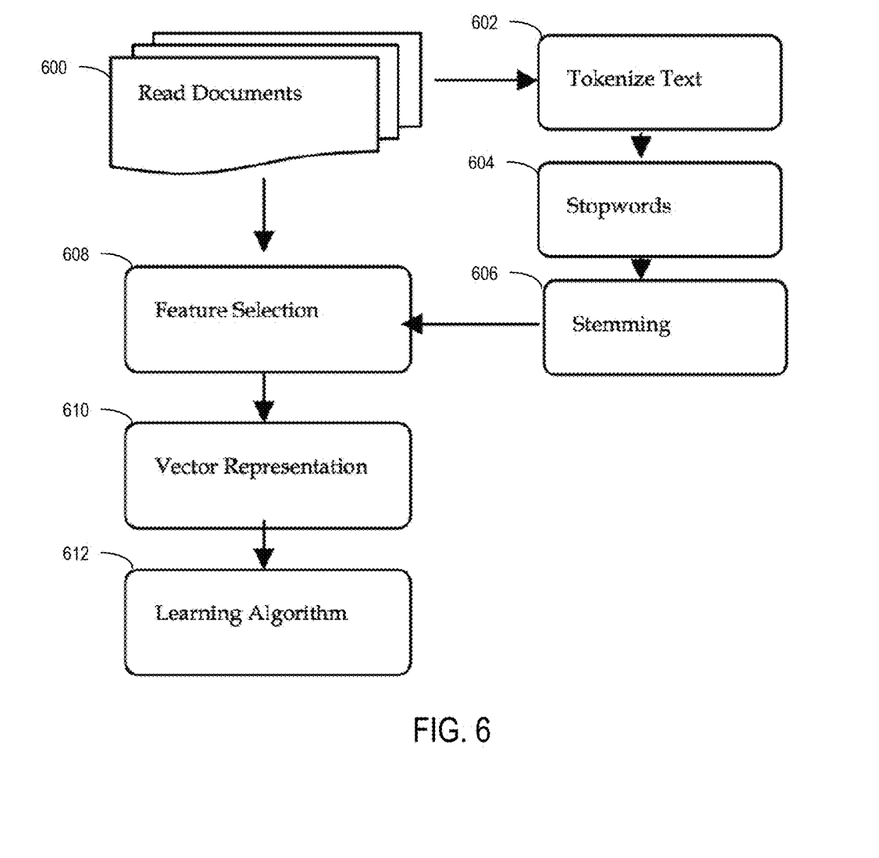
FIG. 6 illustrates a flow chart of an exemplary form categorization process.

Categorization module 208 performs categorization of forms based on features for non-text field characteristics or field-specific text characteristics. FIG. 6, discussed below, provides an example of a process for categorization of forms.

In one example, categorization of forms based on features for non-text field characteristics or field-specific text characteristics involves categorizing new forms added to form repository 104 as the forms are added to the repository. Form categorization involves identifying form features of forms and categorizing the forms based on the features. Using form features for non-text field characteristics or field-specific text characteristics provides particular advantages. For example, the location of a field on a page (located by scanning or already known based on the form's metadata), the locations of some or all of the fields with respect to each other (i.e., the field layout), the information type of those fields, and other field characteristics can alone or in combination with one another, form a feature set or feature vector for the form that can be compared with the feature set or feature vector of other forms (or of a particular category) to categorize the forms.

Form categorization using form features for non-text field characteristics or field-specific text characteristics can be initiated and implemented in various ways. In one embodiment, a form category is represented by one or more example representative forms. The representative forms can be manually identified and then other forms are included in the category if their feature sets are sufficiently similar to those of one of the representative forms. As a specific example, forms sharing at least 5 features with a category representative form are included in the category. Similarly, form categorization can use a form space in which form similarity is assessed. A categorization process can find all forms that are within a threshold distance of a representative form in field space, where the distance represents similarity of the form features for field characteristics.

In one embodiment, a category is defined by a set of features. Such features can be manually identified for each category. For example, an IRS category may be defined by font size smaller than 10 point font on greater than 80% of the fields, at least 20 fields in the form, particular keywords ("IRS," "tax," etc.) appearing on the form, etc. These features can be weighted and used to assess whether a given form is in the category. The more features a given form has and the more highly-weighted those features are, the more likely the form will be categorized within the category. A greater correlation of features corresponds to a greater degree of belongingness, which could then in turn be used in ranking forms to be presented to the user in 110a-c. Note that non-text field characteristics can be used alone as features or non-text field characteristics can be used together with text-based field characteristics to provide the form features.

By categorizing forms using features for non-text field characteristics or field-specific text characteristics, forms are categorized more accurately and more quickly. Better categorization of forms significantly improves the experience of a person searching for forms or wishing to browse through forms in a particular category. The improved searching and browsing also enables searching on phones, tablets, and other small devices. Because the search results are more likely to be relevant, less time-consuming and frustrating navigation on the small device will be required.

Figure 3:
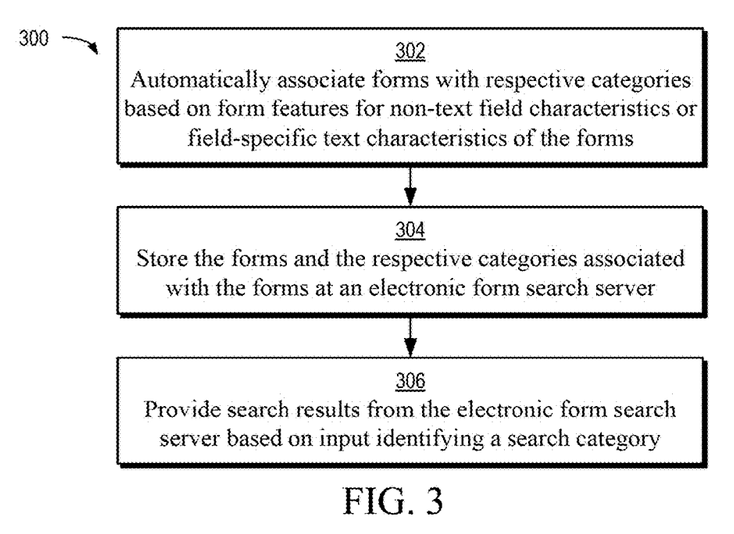
FIG. 3 is a flow chart of an exemplary method for facilitating searching for a form by associating forms with categories based on form features.

FIG. 3 is a flow chart of an exemplary method 300 for facilitating searching for a form by associating forms with categories based on form features. Method 300 can be performed by electronic form categorization and search server 102 of FIG. 1 or any other suitable device.

Method 300 involves automatically associating forms with respective categories based on form features for non-text field characteristics or field-specific text characteristics of the forms, as shown in block 302. In one embodiment, associating forms with respective categories comprises determining a feature vector for individual forms, wherein respective feature vectors comprise a plurality of form features. Associating the forms with the categories is then based on the feature vectors. In one embodiment, a feature vector is defined by several normalized measurements including, but not limited to, the average font size of field labels, average height of form fields, average vertical spacing between vertically stacked form fields, and percentage of form fields contained within a table. Such a feature vector for an IRS form would typically have very different coefficients from that of a typical neighborhood interests form.

Method 300 further involves storing the forms and the respective categories associated with the forms at an electronic form search server, as shown in block 304. Storing the forms and the respective categories associated with the forms can involve tagging each form with a best matching category, one or more associated categories, a ranked listing of associated categories, and the like. In one embodiment, storing the forms and the respective categories associated with the forms involves storing an indication of significance of a category to a form, e.g., category A is the form's primary category and categories B and C are secondary categories, etc. Another embodiment simply stores the feature vector values and then perform ranking based on the feature vector and the actual category store is a post-processing step. This facilitates the ability to quickly and easily search a new category.

Method 300 further involves providing search results from the electronic form search server based on input identifying a search category, as shown in block 306. For example, a user may enter input requesting to browse all forms in a college admissions form category and receive search results that include all of the forms in that category. In another example, a user may enter input requesting to search for forms in a "Wills" category and having the keyword "California," and receive search results that include only forms from the "Wills" category and, of those, only forms that include the keyword "California." Searches may also identify multiple categories. For example, a search may request forms that are in both an "IRS" category and a "Forms for the Disabled" category.

Figure 4:
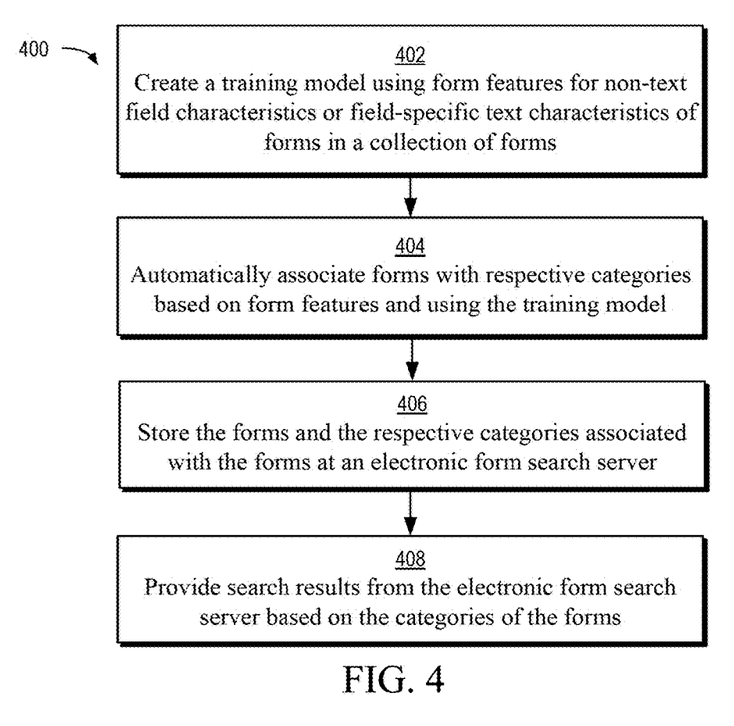
FIG. 4 is a flow chart of an exemplary method for facilitating searching for a form by associating forms with categories using a training model.

FIG. 4 is a flow chart of another exemplary method 400 for facilitating searching for a form by associating forms with categories using a training model. Method 400 can be performed by electronic form categorization and search server 102 of FIG. 1 or any other suitable device.

Method 400 involves creating a training model using form features for non-text field characteristics or field-specific text characteristics of forms in a collection of forms, as shown in block 402. The training model represents the significance (e.g., via coefficients used in a model) of each of the form features to each of the categories. In one embodiment, creating the training model involves using a collection of pre-categorized forms. For example, user input may identify categories for forms in a collection of forms. Features can be extracted from these forms and used as indicators of the form. In one embodiment, individual categories are associated with particular feature vectors that identify features that forms in the category likely have. Such a feature vector may assign weights to the features of the vector.

Any appropriate algorithm can be used to develop a training model. Such algorithms can be used to construct unigram/bigram models for individual form categories. In cases of supervised data, exemplary classification algorithms include, but are not limited those involving naive Bayes, support vector machine (SVM), decision tree, logistic regression, K-nearest neighbor (KNN), neural networks, latent semantic analysis, Rocchio's algorithm, fuzzy correlation and genetic algorithms, boosting algorithms-AdaBoost, and random forest.

Certain embodiments use user input to initiate categorization of forms. For example, input can be received to identify a number of categories, to identify particular categories and/or features for such categories, and/or user input categorizing a sample set of forms. For example, one embodiment involves receiving user input categorizing forms in a collection, creating a training model using the collection of categorized forms, and applying the training model to uncategorized forms to categorize the uncategorized forms in the respective categories based on the form features for the non-text field characteristics or field-specific text characteristics of the forms.

In other embodiments, creating a training model is unsupervised and based on distances between form-specific features of the forms. In one embodiment, creating the training model comprises using the machine learning algorithm on uncategorized forms in the collection of forms, the training model using coefficients representing belongingness to individual categories of a number of categories. The number of categories may be predetermined or adaptive. For example, if a predetermined number of categories is used as a starting point and an analysis determines that combining two of the categories leads to a superior result with better overall categorization scores (i.e., the number of items which definitively belong to a single category increases dramatically), the system can adaptively adjust the number of categories to best fit the data and still maintain the highest number of categories as is reasonable. In another example, a predetermined number of categories is used and then users are optionally permitted to add new categories to provide user-specific custom categories. In such scenarios, the system can adaptively adjust to include the new categories. In one embodiment, the model is retrained for that particular user to include the new categories. This allows for supervised retraining of the model. The model is thus customized for each user based on the user-specific custom categories. In another embodiment, rather than retrain the model, when an user performs a category specific search for a new category, the system shows results based on the distances between the form features of the forms, providing an unsupervised solution.

After creating a training model, method 400 involves automatically associating forms with respective categories based on form features and using the training model, as shown in block 404. For a given form to be associated with a category, i.e., categorized, the form's field characteristics are examined and used as input to the training model to identify one or more appropriate categories.

Method 400 further involves storing the forms and the respective categories associated with the forms at an electronic form search server, as shown in block 406. The storing of forms and categories can be performed using similar techniques as those described with respect to block 304 of FIG. 3. For example, forms can be stored with tags identifying associated categories, best matching categories, category rankings, category significance, metadata indicating category associations, etc. The stored information can additionally or alternatively represent feature vector scores.

Method 400 further involves providing search results from the electronic form search server based on input identifying a search category, as shown in block 408. The provision of search results can involve similar techniques as those described with respect to block 306 of FIG. 3.

Figure 5:
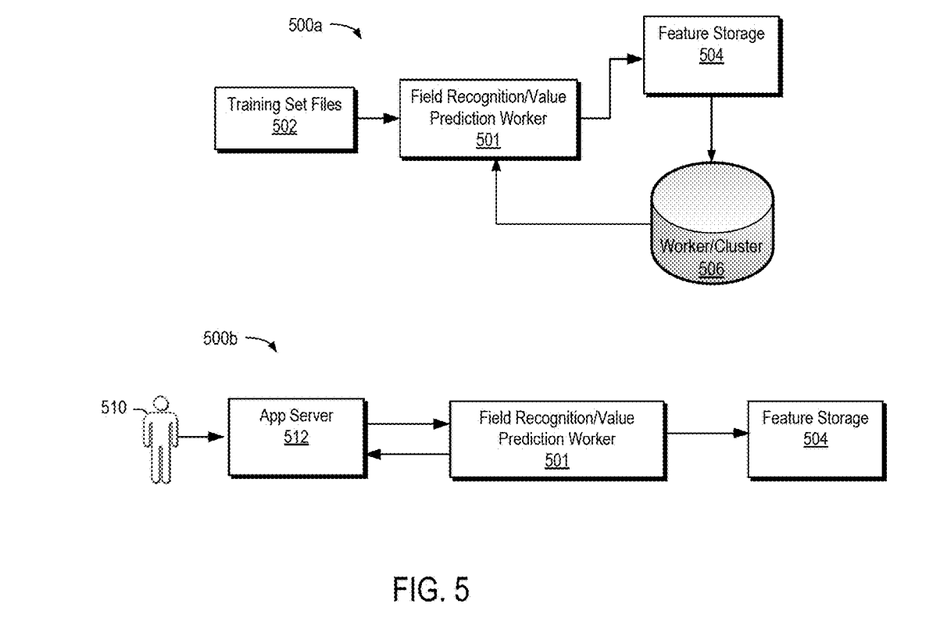
FIG. 5 illustrates flow charts illustrating an exemplary technique for associating a form with a category.

FIG. 5 illustrates flow charts illustrating an exemplary training phase 500a and runtime phase 500b. In the training phase 500a, feature extraction is performed by field recognition/value prediction worker 501 using a training set of files 502. The training set of files includes a plurality of forms from a variety of different categories, although the forms are not necessarily already determined to be associated with such categories. The field recognition/value prediction worker 500 identifies features of the forms and provides the features for storage in feature storage 504. In one example, the forms are examined using image recognition software that recognizes fields based on characteristics of the graphics in the forms. In another embodiment, fields are identified based on metadata associated with the form. Other embodiments use these techniques in combination with one another or using alternative or additional techniques to identify fields in the forms.

The field recognition/value prediction worker 501 can extract various features. The following exemplary form features have been found useful in predicting categories of forms. The number of fields in the form and spacing between the fields are useful features. For example, a "hobbies" related form may have the label and field spaced far from each other, whereas for "tax" related forms, the text and the fields might be closely spaced. The number of segments in the form is also a useful feature. Extracting such information can help distinguish complex and simple forms from one another. The font size distributions of field labels and the font sizes used for the text in different lines are also useful features. For example, complex forms may have tiny fonts and simpler forms may have large fonts. Other useful features include the title of the form, bold text in the form, field decorations, text inside page margins, types of field and label representations (e.g., use of comb fields, with either a closed or open top border; the use of tables, either lined or white space; single underlines with labels underneath; single underlines with labels to the left; boxes with the labels inside), and logos/names present at the top of form, among others.

The data from the feature storage 504 is provided to worker/cluster 506, for example, in a weekly or biweekly export of the data for training purposes. The worker/cluster analyzes the feature data and provides weights to the field recognition/value prediction worker 501 based on the training data. For example, the weights can represent the relative significance of one or more features to a particular category.

Field recognition/value prediction worker 501 also responds to requests to categorize new forms. In the runtime phase 500b, user 510 uploads a form to application server 512. Application server 512 sends the form and requests a category for the form to the field recognition/value prediction worker 501. The field recognition/value prediction worker 501 examines the features of the uploaded form and the features for the potential categories and determines one or more potential categories for the uploaded form. It then sends the category back to the application server 512 in response to the request for the category.

In one embodiment, a user feedback mechanism allows the user to approve the system-identified categories for the form or associate new category to the form before adding that form to the feature storage for that category. If such a feedback mechanism is used, the initial feature extraction and subsequent user assignments may be hashed to provide greater security. In one embodiment, the field recognition/value prediction worker 501 performs feature extraction and determines a confidence value that the feature is representative of a particular category. In this example, if the field recognition/value prediction worker sends the category back with a predetermined confidence cutoff (e.g., 95% or greater), then the features are hashed and are added to the feature storage for the category. Essentially once the feature vector of the form is matched to a category, then that form can be used to grow the feature storage as if it had been a training file. In this way, the criteria are determined and/or refined for determining whether a given form should be categorized in a particular category or not.

FIG. 6 illustrates a flow chart of an exemplary form categorization process. In this example, the process reads the form at step 600. Forms can be collected in any appropriate manner. In one example, a small collection of forms (e.g., 50-100) are collected for identified form categories. In one specific, example such forms are collected using a simple crawler program which would fetch PDFs and other images provided as results for particular keywords. This might involve, for example, extracting the first 100 health related PDFs/images from a web search result for keywords such as "health forms PDF" of "health form images." In addition or alternative, forms can be manually compiled by manually fetching forms from well-known health-related sites such as the forms from well-known health insurance companies for health forms or from the IRS website for tax forms.

After reading the form, the process of FIG. 6 tokenizes text at step 602, removes stopwords at step 604, performs stemming at step 606, and then performs feature selection at step 608. After selecting the features, vector representations are determined at step 610, and a learning algorithm is developed at step 612. In one example, after extracting required features from the form, these features are represented as a vector in n-dimensional space and referred to as the feature vector. The feature vector is an n-dimensional vector of numerical features that represent an object's important characteristics. For example when representing a form, the feature values might correspond to, but not be limited to, the average font size of field labels, average height of form fields, average vertical spacing between vertically stacked form fields, etc. The values of these features can be absolute measures or Boolean measures. Absolute measures include, for example, feature1: average font size of field labels is x mm and feature2: average height of form fields is y mm, feature3: average vertical spacing is z mm. Note: x, y, z are numeric variables and that mm represents millimeters. These measurements are normalized and will lie in the range 0 to 1. If the normalized values are a, b and c respectively, then the vector representation of this form would be [a b c].

Boolean measures for the features can be categorized values, which fit many values, for example, feature1: all font size in a range 1-50, feature2: all font size in a range 50-100, feature3: height of range 50-100, Feature4: height of range 50-100 and so on. The output value is 1 if it lies in the range or 0 if it does not. The vector representation of a form with average font size: 25, height: 65 is represented as [1 0 1 0] where the first position corresponds to feature1, second to feature 2 and so on. These vector representation can get complex as more features and weights are added to the features.

Once the forms are represented as feature vector, the feature vector is input into the learning algorithm, e.g., a linear classifier algorithm. For a two-class classification problem, the operation of a linear classifier can be visualized as splitting a high-dimensional input space with a hyperplane so that all points on one side of the hyperplane are classified as "yes", while the others are classified as "no".

While the techniques for classifying forms described herein have primarily been discussed in the context of use to facilitate form search, many other uses are envisioned. Automatic and accurate form classification can also be used to facilitate form interpretation, automatic tagging, and other functions performed on forms that can be tailored for the particular type of form. For example, knowing a form's category (e.g., medical, financial, school, hobby) can be used to determine whether to interpret a signature field to identify whether the field requires use of a formal, full-name signature or just first and last name and what type of signature to use (i.e., digital or image). Additionally, the techniques disclosed herein can be used with respect to different sections of a form. This can be useful in a scenario in which a form has multiple sections that each need to be filled out by different people. In such a case, the system may determine that the individual sections have different complexities and/or are associated with different categories.

Exemplary Computing Environment

Figure 7:
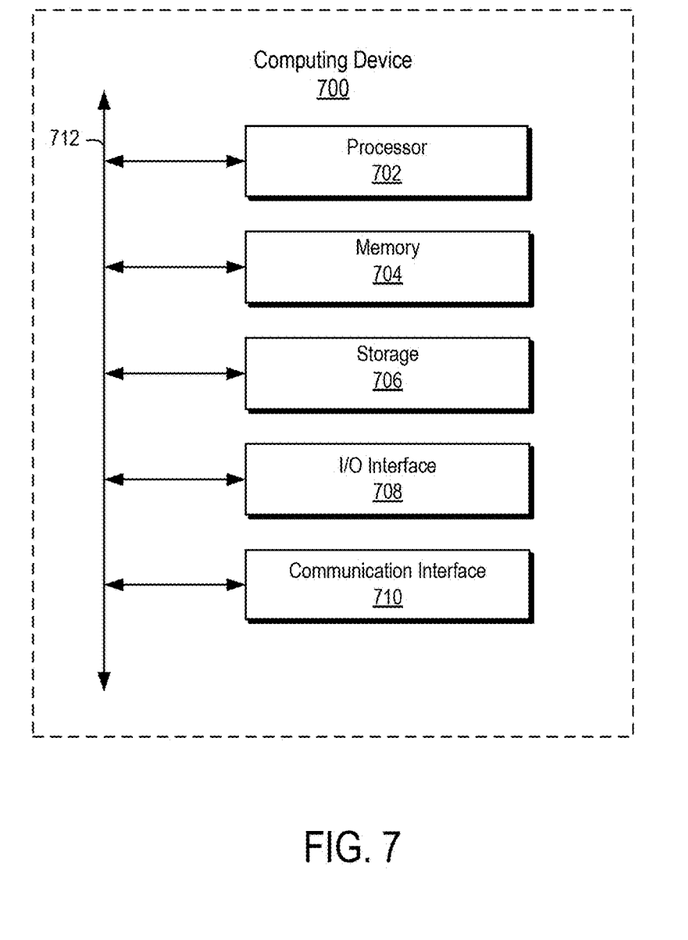
FIG. 7 is a block diagram depicting example hardware implementations for the components described in FIG. 1.

Any suitable computing system or group of computing systems can be used to implement the computer devices of FIG. 1 or otherwise used to implement the techniques and methods disclosed herein. For example, FIG. 7 is a block diagram depicting examples of implementations of such components. The computing device 700 can include a processor 702 that is communicatively coupled to a memory 704 and that executes computer-executable program code and/or accesses information stored in the memory 704 or storage 706. The processor 702 may comprise a microprocessor, an application-specific integrated circuit ("ASIC"), a state machine, or other processing device. The processor 702 can include one processing device or more than one processing device. Such a processor can include or may be in communication with a computer-readable medium storing instructions that, when executed by the processor 702, cause the processor to perform the operations described herein.

The memory 704 and storage 706 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 700 may also comprise a number of external or internal devices such as input or output devices. For example, the computing device is shown with an input/output ("I/O") interface 708 that can receive input from input devices or provide output to output devices. A communication interface 710 may also be included in the computing device 700 and can include any device or group of devices suitable for establishing a wired or wireless data connection to one or more data networks. Non-limiting examples of the communication interface 710 include an Ethernet network adapter, a modem, and/or the like. The computing device 700 can transmit messages as electronic or optical signals via the communication interface 710. A bus 712 can also be included to communicatively couple one or more components of the computing device 700.

The computing device 700 can execute program code that configures the processor 702 to perform one or more of the operations described above. The program code can include one or more of the modules of FIG. 2. The program code may be resident in the memory 704, storage 706, or any suitable computer-readable medium and may be executed by the processor 702 or any other suitable processor. In some embodiments, modules can be resident in the memory 704. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. In a computer network environment, a method for facilitating searching for a form by associating forms with categories based on form features, the method comprising:
   receiving, by a processor of a computing device, a quantity of categories, each category indicating a form feature, wherein the form features include (i) non-text field characteristics indicating a relation between multiple field locations, and (ii) field-specific text characteristics indicating an association between a form field and a label of the form field;
   determining a category feature vector for each of the categories, each respective category feature vector indicating form features associated with the respective category;
   determining a form feature vector for a respective form from a set of forms, each respective form feature vector indicating form features associated with the respective form;
   automatically associating, by the processor, the set of forms with respective categories of the quantity of categories, the association based on a similarity between the category feature vectors of the respective categories and the form feature vectors of the set of forms;
   automatically determining, based on form features of a particular form of the set of forms, a combination of at least two categories to which the particular form belongs;
   automatically adjusting the quantity of categories to include a combined category based on the combination of the at least two categories;
   storing the forms and the respective categories associated with the forms at an electronic form search server; and
   providing search results from the electronic form search server based on input identifying the combined category, a form identified as a search result based on the form being associated with the at least two categories.

2. The method of claim 1, wherein associating forms with respective categories comprises:
   creating a training model using a collection of forms; and
   applying the training model to additional forms to associate the additional forms with the respective categories based on form features for the non-text field characteristics or field-specific text characteristics of the additional forms.

3. The method of claim 1, wherein associating forms with respective categories comprises:
   using a machine learning algorithm to create a training model using a collection of pre-categorized forms, the training model representing a significance of each of the form features to each of the categories; and
   applying the training model to additional forms to associate the additional forms with the respective categories based on form features for the non-text field characteristics or field-specific text characteristics of the additional forms.

4. The method of claim 1, wherein associating forms with respective categories comprises:
   receiving user input categorizing forms in a collection;
   creating a training model using the collection of categorized forms; and
   applying the training model to uncategorized forms to categorize the uncategorized forms in the respective categories based on the form features for the non-text field characteristics or field-specific text characteristics of the forms.

5. The method of claim 1, wherein associating forms with respective categories comprising determining a feature vector for individual forms, wherein respective feature vectors comprise a plurality of form features, wherein associating the forms with the categories is based on the feature vectors.

6. The method of claim 1, wherein associating forms with respective categories is unsupervised and is based on distances between the form features of the forms.

7. The method of claim 1, wherein storing the forms and the respective categories associated with the forms comprises at least one of: storing an indication of significance of a category to a form, or tagging each form with a best matching category.

8. The method of claim 1, wherein:
   determining the form feature vector includes identifying a field for each form, wherein the field is identified based on graphical characteristics of the set of forms or metadata associated with the set of forms, and the non-text field characteristics and the field-specific text characteristics are based on the identified fields.

9. In a computer network environment, a method for facilitating searching for a form by associating forms with categories using a training model, the method comprising:
creating a training model using form features for non-text field characteristics or field-specific text characteristics of forms in a collection of forms, wherein the non-text field characteristics indicate a relation between multiple field locations, and the field-specific text characteristics indicate an association between a form field and a label of the form field;
determining category feature vectors based on the training model, each category feature vector indicating form features associated with a category in a quantity of categories;
determining form feature vectors based on the training model, each form feature vector indicating form features associated with a respective received form;
automatically associating, by a processor of a computing device, a set of forms with respective categories in the quantity of categories, using the training model and based on a similarity between the category feature vectors and form features associated with the set of forms;
automatically determining, based on form features of a particular form of the set of more forms, a combination of at least two categories to which the particular form belongs;
automatically adjusting the quantity of categories to include a combined category based on the combination of the at least two categories;
storing the forms and respective categories at an electronic form search server;
providing search results from the electronic form search server based on the combined category of the forms, wherein the search results include an identified form based on the form being associated with at least two categories; and
automatically modifying the training model to associate forms with respective categories in the adjusted quantity of categories.

10. The method of claim 9, wherein creating the training model uses a collection of pre-categorized forms, the training model representing a significance of each of the form features to each of the categories.

11. The method of claim 9, wherein creating the training model comprises using a machine learning algorithm on uncategorized forms in the collection of forms, the training model using coefficients representing belongingness to individual categories of a predetermined number of categories.

12. The method of claim 9, wherein creating the training model comprises using a machine learning algorithm on uncategorized forms in the collection of forms, the training model using coefficients representing belongingness to individual categories of an adaptive number of categories.

13. The method of claim 9 further comprising tagging individual forms with a best matching category.

14. The method of claim 9, wherein storing the forms and the respective categories comprises storing an indication of significance of a category to individual forms.

15. The method of claim 9, wherein storing the forms and the respective categories comprises tagging individual forms with multiple relevant categories based on determining that the form is associated with more than one category.

16. A system comprising:
a processing device; and
a memory device communicatively coupled to the processing device,
wherein the processing device is configured to execute instructions included in the memory device to perform operations comprising:
receiving a quantity of categories, each category indicating a form feature, wherein the form features include (i) non-text field characteristics indicating a relation between multiple field locations, and (ii) field-specific text characteristics indicating an association between a form field and a label of the form field;
determining a category feature vector for each of the categories, each respective category feature vector indicating form features associated with the respective category;
determining a form feature vector for a set of forms, each respective form feature vector indicating form features associated with the respective form;
automatically associating, by the processing device, the set of forms with respective categories of the quantity of categories, the association based on a similarity between the category feature vectors of the respective categories and the form feature vectors of the set of forms;
automatically determining, based on form features of a particular form of the set of forms, a combination of at least two categories to which the particular form belongs;
automatically adjusting the quantity of categories to include a combined category based on the combination of the at least two categories;
storing the forms and the respective categories associated with the forms at an electronic form search server; and
providing search results from the electronic form search server based on input identifying the combined category, a form identified as a search result based on the form being associated with the at least two categories.

17. The system of claim 16, wherein associating forms with respective categories comprises:
creating a training model using a collection of pre-categorized forms; and
applying the training model to additional forms to associate the additional forms with the respective categories based on form features for the non-text field characteristics or field-specific text characteristics of the additional forms.

18. The system of claim 16, wherein associating forms with respective categories comprises:
using a machine learning algorithm to create a training model using a collection of pre-categorized forms, the training model using a respective coefficient representing a significance of each of the form features to each of the categories; and
applying the training model to additional forms to associate the additional forms with the respective categories based on form features for the non-text field characteristics or field-specific text characteristics of the additional forms.

19. The system of claim 16, wherein associating forms with respective categories comprises:
receiving user input categorizing forms in a collection;
creating a training model using the collection of categorized forms; and applying the training model to uncategorized forms to categorize the uncategorized forms in the respective categories based on the form features for the non-text field characteristics or field-specific text characteristics of the forms.

20. The system of claim 16, wherein associating forms with respective categories comprising determining a feature vector for each form, wherein respective feature represent the form features, wherein associating the forms with the categories is based on the feature vectors.

* * * * *